May 22, 1923.
R. M. ROOF
PROCESS OF MAKING DIVIDED BEARINGS
Filed June 21, 1920
1,455,939
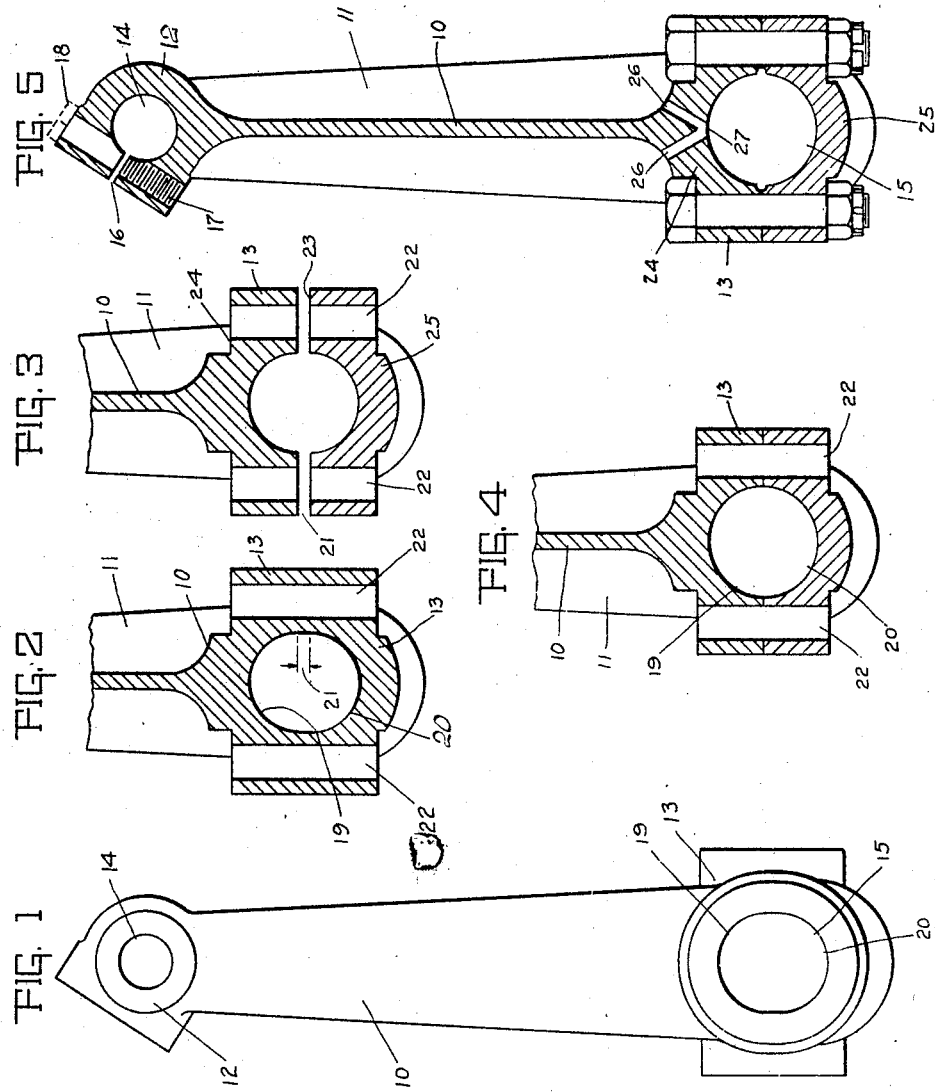
Robert M. Roof
INVENTOR.
BY
Lockwood & Lockwood
ATTORNEYS Patented May 22, 1923.

1,455,939

UNITED STATES PATENT OFFICE.

ROBERT M. ROOF, OF ANDERSON, INDIANA, ASSIGNOR TO LAUREL MOTORS CORPORATION, OF ANDERSON, INDIANA.

PROCESS OF MAKING DIVIDED BEARINGS.

Application filed June 21, 1920. Serial No. 390,448.

*To all whom it may concern:*

Be it known that I, ROBERT M. ROOF, a citizen of the United States, and a resident of Anderson, county of Madison, and State of Indiana, have invented a certain new and useful Process of Making Divided Bearings; and I do hereby declare that the following is a full, clear, and exact description thereof, reference being had to the accompanying drawings, in which like numerals refer to like parts.

This invention relates to shaft bearings and the like and in particular to connecting rod bearings for the crank shaft of an internal combustion engine or similarly divided bearings for shafts.

The chief object of this invention is the production of a shaft bearing generally and in particular the connecting rod bearing in a final and improved manner which will reduce the cost of production and eliminate waste.

The chief feature of the invention consists in casting or forming the bearing unitarily and providing the same with an elongated shaft bearing opening, then dividing the bearing at the elongated portion of the opening and then machining the divided bearing in assembled relation to the true bearing opening.

A further feature of the invention is the H-shape of the body portion of the connecting rod and the positioning of lubricating ports at the base of each groove formed by the H, said ports terminating at the bearing surface in a joint discharge opening.

The full nature of this invention will be understood from the accompanying drawings and the following description and claims.

In the drawings Fig. 1 is a side elevational view of a unitary connecting rod body portion before being operated upon. Fig. 2 is a central sectional view of the bearing portion of the connecting rod illustrating the same after the securing and aligning openings have been provided. Fig. 3 is a similar view showing the bearing after being divided. Fig. 4 is a similar view showing the divided bearing in the aligned position. Fig. 5 is a central sectional view of the complete bearing and rod showing the same in assembled relation.

In the drawings 10 indicates a body portion of a connecting rod which is shown in the drawing as preferably H-shaped to form a pair of deep grooves 11. Upon one end of the body portion 10 is secured the usual pivot or pin bearing 12, while upon the other end of the rod is positioned the usual crank shaft bearing 13. The connecting rod blank may be cast or formed such that the same is provided with a pin bearing opening 14 in one end and a shaft bearing opening 15 in the opposite end. The pin bearing opening 14 is formed in the usual manner and is suitably slotted at 16 and extending transversely of said slot and communicating therewith is the threaded opening 17 adapted to receive a suitable clamping member or bolt 18 by which the tension of the bearing upon the pin is adjusted, all of which is of the usual construction.

The shaft bearing 13 is formed unitary and the opening 15 comprises two circular portions 19 and 20 and an intermediate portion 21 indicated by the arrows in Fig. 2. Each of the portions 19 and 20 are similar semi-circular portions which are spaced apart by the portion 21. The bearing is then provided with a plurality of substantially parallel securing and aligning openings 22 and then the bearing is divided at 23, the width of the saw kerf being substantially equal to the spacing portion 21 of said elongated bearing opening, such that when said bearing is divided to form the connecting rod portion 24 and the cap portion 25 and the same are secured together in assembled and aligned relation by means of the aligned openings 22, the semicircular openings 19 and 20 register with each other and form a substantially circular shaft opening. The divided parts 24 and 25 are suitably secured together in the aligned position by means of bolt means extending through the aligning openings 22, and the shaft bearing opening 15 is then machined to the true bearing opening if the same is necessary, the completed bearing being illustrated in Fig. 5.

A further feature of the invention, other than the process of forming the same, consists in providing an H-shaped connecting rod with the lubricating port or channel 26 communicating with the base of each groove 11, and communicating with each other at the point 27 adjacent the shaft bearing opening 15. Thus the connecting rod is adapted to collect lubricant and said lubricant after collecting at the base of the grooves in said connecting rod discharges on the shaft bearing out through the port 27. The foregoing process of forming a divided shaft bearing reduces the cost of production by casting or forming the bearing in one piece; and also by forming at one operation the securing and aligning openings 22.

It will be noted that in the smaller bearings, such as for connecting rods and crank shafts and others of the same size or smaller diameters, the process as described materially reduces the cost of production and reduces the waste, since in each instance the connecting rod bearing portion and the cap portion of the bearing will always be complementary to each other to form a true bearing when secured together.

The invention claimed is:

1. The process of forming a divided bearing for shafts and the like comprising the steps of forming a unitary bearing blank with an elongated opening, providing aligned and securing openings in the unitary bearing blank, and dividing the unitary bearing at the elongation of said opening to remove said elongation from said bearing opening to form a true bearing opening when said divided bearing is secured in the assembled and aligned position.

2. The process of forming a divided bearing for shafts and the like comprising the steps of forming a unitary bearing blank with an elongated opening, providing aligned and securing openings in the unitary bearing blank, dividing the unitary bearing at the elongation of said opening to remove said elongation from said bearing opening to form a true bearing opening when said divided bearing is secured in the assembled and aligned position, securing said divided bearing in assembled relation through said securing and aligned openings and machining said bearing opening to the finished bearing opening.

3. In the method of making bearings or the like, the forming of a blank having two semi-cylindrical end portions and an intermediate portion connecting said end portions, and the removing of the intermediate portion.

In witness whereof, I have hereunto affixed my signature.

ROBERT M. ROOF.